United States Patent
Anderson et al.

(10) Patent No.: US 6,633,449 B1
(45) Date of Patent: Oct. 14, 2003

(54) HIGH BANDWIDTH TAPE POSITIONING SYSTEM AND SERVO CONTROLLED ROLLERS FOR ACTIVE TAPE POSITIONING

(75) Inventors: James C. Anderson, Eagle, ID (US); Curtis P. Gonzales, Eagle, ID (US); Jeffrey S. McAllister, Boise, ID (US)

(73) Assignee: Hewlett-Packard Development, L.P., Houston, TX (US)

( * ) Notice: Subject to any disclaimer, the term of this patent is extended or adjusted under 35 U.S.C. 154(b) by 0 days.

(21) Appl. No.: 09/575,841

(22) Filed: May 22, 2000

(51) Int. Cl.$^7$ .............................................. G11B 15/18
(52) U.S. Cl. .................................... 360/71; 360/130.21
(58) Field of Search ............................ 360/71, 75, 85, 360/76, 130.21, 130.2; 242/334.6

(56) References Cited

U.S. PATENT DOCUMENTS

| | | | | |
|---|---|---|---|---|
| 3,693,227 A | * | 9/1972 | Maxey | 29/281.6 |
| 3,845,501 A | * | 10/1974 | Katsuta et al. | 360/85 |
| 3,900,892 A | * | 8/1975 | Sugaya et al. | 360/85 |
| 4,264,937 A | * | 4/1981 | Kabacinski | 360/85 |
| 4,440,359 A | * | 4/1984 | Nelson | 242/199 |
| 4,491,891 A | * | 1/1985 | Shiba | 242/346.2 |
| 4,508,292 A | * | 4/1985 | Kudelski | 242/334.6 |
| 5,326,044 A | * | 7/1994 | Haller | 242/346.1 |
| 6,005,737 A | * | 12/1999 | Connolly et al. | 360/75 |

* cited by examiner

Primary Examiner—David Hudspeth
Assistant Examiner—Fred F. Tzeng

(57) ABSTRACT

Methods and apparatus for a magnetic tape drive, which allow a magnetic tape to be positioned with respect to a tape head. The invention includes actively controlling the position of a tape guide used to support the tape as it passes over the tape head. By controlling the position of the tape guide, the tape can be caused to move a direction perpendicular to the primary direction of travel of the tape. One method of the invention includes providing a first tape guide aligned along a primary axis and disposed proximate a first side of the tape head. The tape is moved across the first tape guide and the tape head in a primary direction while the first tape guide is pivoted, to thereby cause the tape to move in a secondary direction essentially perpendicular to the primary direction. Alternately, or in addition to the step of pivoting the first tape guide, the method can include the step of translationally moving the first tape guide along the primary axis while moving the tape across the first tape guide and the tape head. The apparatus of the present invention can include one or more tape guides which support a tape as it moves across a tape head. Each tape guide can be configured to tilt or move translationally, or to do both, to cause the tape to move in a direction perpendicular to the primary direction of transport of the tape across the tape head.

27 Claims, 9 Drawing Sheets

HIGH BANDWIDTH TAPE POSITIONING SYSTEM AND SERVO CONTROLLED ROLLERS FOR ACTIVE TAPE POSITIONING

FIELD OF THE INVENTION

The invention relates to magnetic tape read/write devices, and more particularly to methods and apparatus for dynamically positioning a magnetic tape with respect to a tape head in such a device.

BACKGROUND OF THE INVENTION

Despite recent advances in techniques for storing data on high density data storage devices such as compact disks (CDs) and magnetic disks, there still exists a need to store data on magnetic tape. Such data can comprise for example a database of information, such as survey information, as well as a computer program. Magnetic tape provides a low cost alternative to other high density data storage devices. Further, data on magnetic tape can be easily erased and modified, unlike read-only CDs. An additional advantage of magnetic tape over other data storage media is that data can be recorded in analog format, as well as digital format. One example of the use of magnetic tapes is in recording data from a seismic survey.

Magnetic tapes of data are accessed by a tape processing device, which can perform one or both of storing ("writing") data onto the tape, or accessing ("reading") data previously stored on the tape. A generic term for a tape processing device is a "tape drive". A tape processing device comprises a tape head for one or both of reading and/or writing data from or to the magnetic tape. The tape head comprises tape head elements, which can perform one or both of these functions. Tape processing devices typically further include at least one, and typically more, guides for supporting the tape as it moves across the tape head. The guides can either be fixed or stationary guides such as spindles, or rollers which roll with the tape as the tape moves across the tape head. The guides help to align the tape with respect to the tape head. The tape support guides can also be powered rollers to rotate either in the direction of, or opposite to the direction of, the tape travel to assist in transport of the tape across the tape head, and to provide proper tensioning of the tape.

Magnetic tapes are stored on reels, which are typically mounted within a cassette housing. The cassette provides mechanical protection for the tape, and facilitates ease of handling the tape. While some cassettes contain both the tape source reel and a take-up reel onto which the tape is wound as it passes over the tape head, another practice is to configure the cassette with only the tape source reel. In this latter configuration, a free end of the tape is connected to a take-up-reel which is part of the tape processing device. This single-reel cassette design reduces the storage area required to store the tapes, as compared to the storage area requirements for a two-reel cassette.

FIG. 1 shows a simplified plan view of a prior-art design of a tape processing apparatus 1 having a tape head 11, a first tape support guide 12, a second tape support guide 14, and a take-up-reel 16. A single-reel cassette 18 containing a source reel 15 of magnetic tape "T" can be mounted on the tape processing apparatus 1. The free end of the tape "T" is passed over the first tape guide 12, the tape head 11, and the second tape guide 14, and is then connected to the take-up-reel 16. Drive motors (not shown) control the winding of the tape "T" onto the take-up reel, or rewinding the tape onto the source reel 15. FIG. 2 shows a front elevation view of the tape processing apparatus 1 of FIG. 1. In FIG. 2, the tape "T" is shown in partial view to allow the face of the tape head 11 to be displayed. It is understood, however, that the tape "T" passes in front of the tape head in this view. FIG. 2 shows the tape guides 12 and 14. Each tape guide is typically provided with an upper flange 17 and a lower flange 18. The purpose of the tape guide flanges is to keep the tape guided into a relatively fixed position with respect to the tape head 11. As the tape moves past the tape head in either direction "A" or "B", a tape head element 21 can magnetically encode ("write") data onto the tape, or it can read data from the tape, depending on how the element is electronically configured. It is possible to electronically configure a tape head element to perform both read and write functions merely by electronic circuit switching within the tape processing apparatus. The process and apparatus for recording magnetic data onto, and reading data from, a magnetic tape are well known in the art, and generally will not be discussed further herein.

In order to increase the density of data storage onto magnetic tape, the data can be recorded onto the tape in "tracks" or "channels". In a linear tape drive, this essentially consists of segmenting the tape into a plurality of tracks, or horizontal zones, were data is recorded, and separating these data zones with zones where no data is recorded. This separation of the data zones (tracks) allows the data from one track to be distinctly read by the tape head element, without magnetic interference from an adjacent data track. In order to read or write data from or to a multi-track tape, the tape head element needs to be able to access the various tracks. Common practice is to provide the tape head with a plurality of tape head elements. Such a configuration is known as an element array, or merely an "array". One example of an 8-channel element array is shown in FIG. 2. The tape head 11 comprises a first array 22 having 8 elements, and an adjacent second array 23 also having 8 elements. The use of an element array allows data to be simultaneously recorded on, or read from, up to eight tracks. The use of two element arrays allows data to be recorded onto the tape by the first array, and then immediately read from the tape by the second array. In this manner the accuracy of data recorded onto the tape can be verified through comparison of the recorded and read data. By electronic switching within the tape drive, the functions of the arrays can be switched from recording data to reading data, and visa versa.

In one commercial example, a tape drive can have two tape head arrays of eight elements each. Each element is configured to record data onto a track which is 1500 microns ($\mu$) high (in the vertical direction of the tape, i.e., in the direction perpendicular to the primary direction of travel of the tape). Each track is separated by a 28 $\mu$band.

One drawback to tape drives is that the tape tends to "wander" as it moves across the tape head in the primary direction. That is, viewing FIG. 2, as the tape 30 generally moves across the tape head in the horizontal direction, indicated by the arrow "H", the tapes also tends to randomly move up and down in the vertical direction "V". Such vertical movement is typically relatively slow as compared to movement in the horizontal direction, although notable exceptions do occur, as described further below. The effect of tape wander is that data recorded at a given location on a magnetic tape may not be readable if that location wanders away from the read-element when the tape is being read. Tape wander results from inconsistencies in the tape, such as thickness and tension, inconsistencies between tape reels, minor misalignment and tolerances of components within the tape drive itself, and a variety of other factors, collectively making it impractical if not impossible to eliminate tape wander through design changes. One prior art method for accommodating the effects of tape wander is to size the head elements and their spacing (in an array) within the limits of wander. That is, if a head element is big enough, and far enough away from a neighboring element, then the path of tape associated with the corresponding data track will always be in contact with the element, even as the tape wanders. However, this solution has the undesirable effect of reducing the density of data which can be stored on a tape of a given width, since the data channels or tracks are necessarily wider, and fewer tracks can thus be placed onto a tape of a given width.

Another known technique to eliminate the effects of tape wander is for the tape head to track the tape as the tape wanders. That is, by using a control system in conjunction with a tape head positioning device, the vertical position of the tape at any given time can be determined, and then the tape head can be moved up or down to keep the tape head in relative fixed position with the tape, even as the tape wanders. However, occasionally the tape will wander to the extreme edge of a tape guide. When this occurs, the edge of the tape hits the tape guide flange (see items 17 and 18 of FIG. 2), and the tape is radically moved in the opposite vertical direction back onto the tape guide. Most tape head tracking positioners are essentially incapable of following such radical movement within the necessary parameters. This has the detrimental effect of causing the tape elements to fail to accurately track a channel on the tape when the tape makes a radical change in position. The result is that if a tape jump of significant magnitude occurs when the tape head is processing data from or to the tape, some data may not be read from the tape, or some data recorded on the tape might be incapable of being read later. The obvious solution of removing the tape guide flanges is of course impractical, since the tape could then wander off the tape guide.

One solution is to use a high-speed (high bandwidth) tape head control positioner for the tape head. Such a positioner typically comprises a linear motor. However, one drawback to the using such a tape head positioning device is that with the use of a linear servo motor, the head is subject to the effects of shock and vibration in the chassis of the tape drive. This is due to the fact that the base of the linear motor, as well as the tape reel supports, are essentially fixed to the chassis of the tape drive. Any motion in the drive chassis will thus be imparted to these two components. However, the tape head in such a system is mounted to the slide portion of the linear motor, such that the tape head is essentially free-floating in the vertical direction and is only held in position by electromagnetic forces. Thus, the tape head will tend to stay in position as the tape chassis, and with it the tape, are moved as a result of shock and vibration imparted to the chassis. This has the detrimental effect of causing the tape elements to fail to accurately track a channel on the tape when a shock or significant vibration is imparted to the tape drive. The results can be unread or unreadable data, as described above.

An additional drawback to magnetic tapes is that as the tape is wound onto one of the tape reels, the tape can bump up against the upper or lower flange of the tape reel. This can cause damage to the tape, and so it is preferable to center the tape on the tape reel between the flanges of the reel. However, if the tape is perfectly aligned when it is wound onto one of the tape reels, yet another problem can occur. Due to a small increase in the thickness of the tape at the outer edges of the tape, when the outer edges are all aligned on the tape reel, the cumulative effect can be to produce a crinkling effect at the edge of the tape. This can result in mechanical damage of the tape, and is therefore to be avoided.

What is needed then is a tape drive which is capable of accommodating the effect of, or preferably minimizing the phenomenon of, tape wander. What is also needed is a way to more effectively wind magnetic tape onto a reel to prevent damage to the tape.

SUMMARY OF THE INVENTION

The present invention includes methods and apparatus for a magnetic tape processing device, or tape drive, which allow a magnetic tape to be positioned with respect to a tape head configured to write data to, or read data from, the magnetic tape. The invention comprises actively controlling the position of a tape guide used to support the tape as it passes over the tape head. By controlling the position of the tape guide, the tape can be caused to move in a direction perpendicular to the primary direction of transport of the tape past the tape head.

In a first embodiment, the invention comprises an apparatus for positioning a moving magnetic tape with respect to a tape head element in a tape head. The apparatus includes a first tape guide supported proximate to a first side of the tape head and mounted along a primary axis of the tape guide. For example, if the tape guide is cylindrical in shape, then the tape guide is mounted along the longitudinal axis of the tape guide. The first tape guide is configured to support the magnetic tape as the tape travels past the tape head. The apparatus also has a first tape guide tilt positioner configured to tilt the first tape guide. Preferably, the tape guide is configured to tilt towards or away from the magnetic tape, and thereby produce selective differential forces on the tape across its vertical height. In response to these forces, the tape will to move in a vertical direction (either up or down) until the vertical forces on the tape have been equalized.

When the response of the tape to movement of the tape guide can be modeled using an algorithm, the movement of the tape guide (direction and degree) can be controlled by an open-loop control system. Alternately, when the precise response characteristics of the tape to movement of the tape guide cannot be accurately predicted, a closed loop control system can be utilized to control the movement of the tape guide. Such a closed loop system can incorporate a tape position sensor or sensors and a feedback mechanism to provide tape position and movement information to the tilt positioner. This will be further described below.

The apparatus of the first embodiment can further include a first tape guide translation positioner configured to translate the first tape guide along the first tape guide longitudinal axis. This essentially provides for vertical movement of the tape guide along its longitudinal axis. Such movement of the tape guide imparts a drag force on the tape, causing the tape to move in the same vertical direction as the tape guide is moved. In one variation, the tilt positioner is replaced with the translational positioner, so that the tape guide is not configured to tilt, but to move translationally.

In one variation, the above apparatus can also have a second tape guide supported proximate to a second side of the tape head and mounted along the primary axis of second tape guide. The second tape guide is configured to support the magnetic tape as the tape travels past the tape head. This variation also includes a second tape guide tilt positioner configured to tilt the second tape guide in the same manner as the first tape guide can be tilted. The second tape guide can also be connected to a second tape guide translational positioner configured to translate the second tape guide along the second tape guide primary axis.

The apparatus of the present invention can thus include one or more tape guides, and each tape guide can be configured to tilt or move translationally (vertically), or to do both. In a configuration with two tape guides, the tape guides can be configured to tilt or translate independently of one another, or in unison with each other. The apparatus can include a tape guide positioning apparatus, such as a servo mechanism. The positioning apparatus can comprise a sensor for determining the vertical location of the tape at any given time, and an actuator for actuating the tape guide positioner(s). The servo mechanism can be configured to account for the rate and frequency of tape movement desired.

In a second embodiment, the invention includes a method for actively positioning a magnetic tape with respect to a tape head having head elements for at least performing one of writing or reading magnetically encoded data respectively to or from the magnetic tape. The method includes the steps of providing a first tape guide aligned along a primary axis and disposed proximate a first side of the tape head. The tape is then moved across the first tape guide and the tape head in a primary direction while the first tape guide is pivoted, to thereby cause the tape to move in a secondary direction essentially perpendicular to the primary direction. Preferably, the tape guide is tilted towards or away from the magnetic tape, and thereby a selective differential tension is created between the upper and lower edges of the tape. The tape will consequently move vertically (i.e., "up" or "down", relative to a primarily horizontal direction of travel) to relieve the differential forces in the tape, as described above.

Alternately, or in addition to the step of pivoting the first tape guide, the method can include the step of translationally moving the first tape guide along the primary axis while moving the tape across the first tape guide and the tape head in the first primary direction. This will also cause the tape to move in the secondary direction.

The method of the invention can further include providing a second tape guide disposed proximate a second side of the tape head opposite the first side of the tape head, and aligned along a primary axis of the tape guide. The second tape guide is then pivoted about the primary axis of the tape guide while moving the tape across the second tape guide and the tape head in the primary direction, to thereby further cause the tape to move in the secondary direction. As with the first tape guide, the second tape guide can alternately, or additionally, be moved translationally along the primary axis while moving the tape across the second tape guide and the tape head in the first primary direction. This will also cause the tape to move in the secondary direction.

The methods of the invention can further include the steps of providing a position sensor to detect the position of the tape relative to the tape head, and ceasing or initiate tilting, translating, or both movements of the first and/or second tape guides in response to the detected position of the tape.

DETAILED DESCRIPTION OF THE INVENTION

The present invention includes methods and apparatus for a magnetic tape processing device, or tape drive, which allow a magnetic tape to be positioned with respect to a tape head. The invention comprises actively controlling the position of a tape guide used to support the tape as it passes over the tape head. By controlling the position of the tape guide, the tape can be caused to move in the vertical direction (i.e., the direction perpendicular the primary path of the tape). The positioning of the tape guides is preferably performed by a servo mechanism, which includes a tape position detector to determine the direction in which the tape needs to be moved, and thus the positioning of the tape guide to cause movement in the desired direction.

The present invention allows tape wander to be reduced by causing the tape to move away from the direction of wander. The present invention also allows the tape to be rapidly repositioned with respect to the tape head read/write elements, so that selected regions on a magnetic tape can be accessed by elements in the tape head. The variation of the invention which allows tape wander to be reduced by active positioning of a tape guide can use a low bandwidth servo controller, whereas the variation of the invention which allows rapid repositioning of the tape with respect to the tape head elements can use a high band width servo controller. The two embodiments can further be combined in a single tape drive, allowing tape wander to be reduced, and tape access positioning, all by active tape guide positioning.

In addition to positioning the tape with respect to the tape head, active positionable tape guides can be used to position tape when winding the tape onto a take-up reel. In one embodiment, the active positionable tape guides can be used to control the spooling of tape onto a take-up reel to keep the tape from contacting the outer flanges of the tape reel. This will prevent damage to the tape which can result from contact of the outer edges of the tape with the tape reel flanges. In another embodiment, the active positionable tape guides can be used to control the spooling of tape onto a take-up reel to keep the outer edges of the tape from becoming aligned. This will reduce the effects of tape thickness buildup at the outer edge of the tape. In yet a third embodiment, a first active positionable tape guide or guides are used to control tape wander, and a second active positionable tape guide of guides are used to control spooling of the magnetic take onto a take-up reel or reels.

Figure 3:
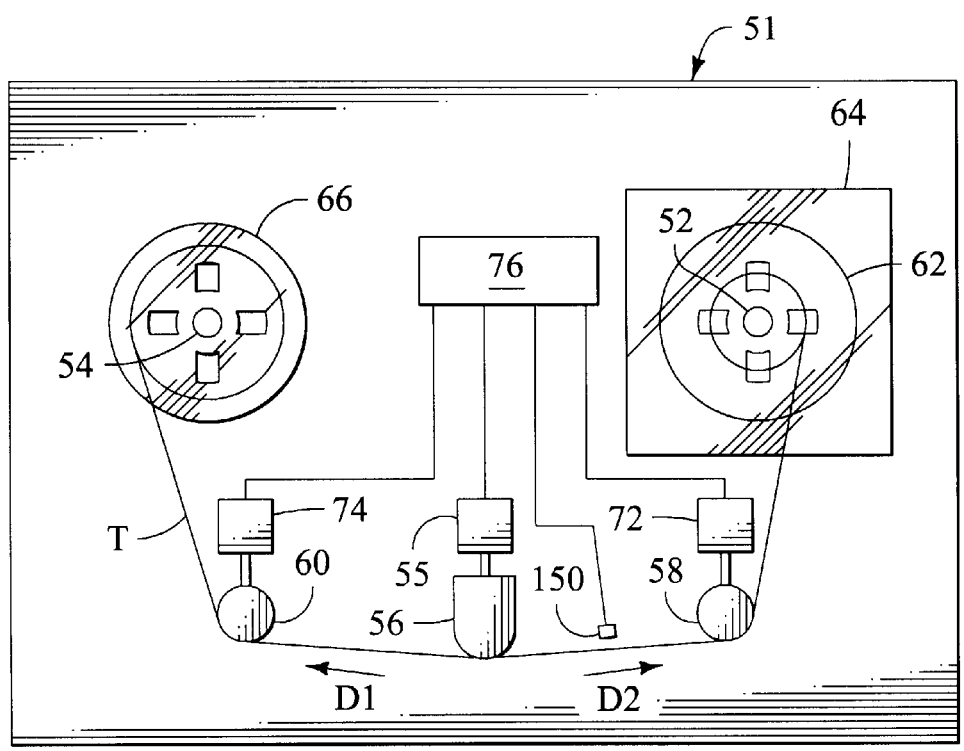
FIG. 3 depicts a simplified plan view of a tape drive incorporating the present invention.

The methods and apparatus are useful in magnetic tape processing devices. Such devices are commonly known as "tape drives", and have the capability of one or both of magnetically encoding data onto, or reading magnetically encoded data from, a magnetic tape. In the following discussion, the process of magnetically encoding data onto a tape will be called "writing to the tape". The process of reading data from, writing data to, or doing both will be known herein as "processing" the magnetic tape. With reference to FIG. 3, a plan view is shown of a tape drive 50, which incorporates apparatus in accordance with the present invention. The basic components of the tape drive are a source tape hub 52, and a take-up-reel hub 54. Each hub is provided with an associated drive motor (not shown), for rotationally driving the hub. The tape drive further comprises a tape head 56, at least a first tape support guide 58, and preferably a second tape support guide 60. A source reel 62 having magnetic tape "T" wound thereon is configured to be removably mounted to the source hub 52. The source reel can be enclosed in a cassette 64 for handling and storage convenience. A take-up-reel 66, typically being empty, is configured to be affixed to the take-up-hub 54. The free end of the tape "T" on the source reel 62 is passed over the first tape support guide 58, past the face of the tape head 56, over the second tape support guide 60, and is then attached to the take up reel 66. The drive motor associated with the take-up-hub 54 can then drive the take-up-reel to cause the tape "T" to move past the tape head 56 in a first primary direction D1, and be spooled onto the take up reel 66. As the magnetic tape is pulled past the tape head 56, the tape head can write data onto the tape, or read data from the tape. The tape can also be moved in the second primary direction D2 by disengaging the drive motor on the take-up-hub 54, and engaging the drive motor associated with the source hub 52. This allows the tape to be rewound onto the source reel 62. The tape drive can be configured to allow the tape head to access the tape for reading or writing data regardless of the primary direction of travel of the tape. A slight drive force can be applied to the take-up drive motor when tape is being rewound onto the source reel in order to prevent the tape from going slack and keep the tape in contact with the tape head. The various components of the tape drive are mounted to the chassis 51.

By "tape guide" we mean any device which is used to guide the tape as it passes over the tape head. In one implementation the guides can be rollers which roll as the tape runs past the guide. In another implementation the guides can be a fixed guide such as a post, capstan or spindle. Typically the guide is cylindrical in shape and is mounted along a primary longitudinal axis, such as axes A1 and A2 shown in FIG. 7 for guides 58 and 60, respectively. However, the guides do not need to be cylindrical, but can be any shape having a smooth surface. For example, the guides can have an elliptical cross section, or a smooth curved front face and a flat rear portion. Therefore, when we discuss the guides being mounted along a primary longitudinal axis, we mean that the guides are mounted along an axis which is essentially parallel to the tape, and which is perpendicular to the primary direction of transport of the tape.

Figure 4:
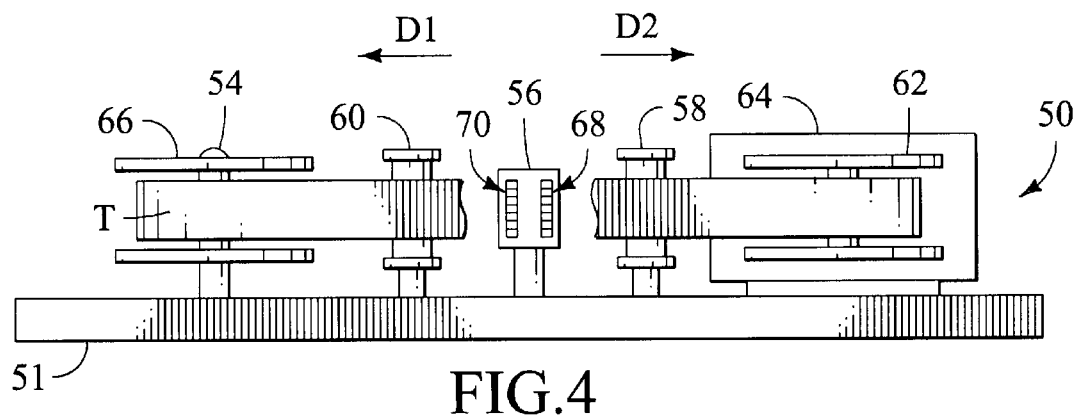
FIG. 4 depicts a front elevation view of the tape drive of FIG. 3.

Turning briefly to FIG. 4, a front elevation view of the tape drive 50 of FIG. 3 is shown. The tape "T" is shown in partial view to allow the face of the tape head 56 to be seen. The tape head 56 comprises a first element array 68, and can comprise a second element array 70. The head arrays each comprise a plurality of elements. Each element allows data to be magnetically encoded onto, or read from, the tape. The tape head is shown in further detail in FIG. 5, described below. Although the tape is shown as being oriented with its upper and lower edges in a vertical position, and moving in a horizontal direction, it is understood that the tape can be oriented in any direction. The methods and apparatus of the present invention are not limited to a tape positioned like that shown in FIG. 4, but can work for a tape oriented in any position. However, for the sake of simplifying the discussion herein, the tape will be described as traveling "horizontally" when moving from one reel to the other. A more general expression for describing the direction of tape travel between reels is that the tape travels in a "primary direction". Similarly, in the following discussion the tape is described as wandering and being repositioned in a "vertical" direction. A more general expression for describing the direction of wander and repositing is that the tape wanders, and is moved to reposition it, in a second direction perpendicular to the primary direction of travel.

The tape drive 50 of FIG. 3 further comprises a first tape guide positioner 72, and can also comprise a second tape guide positioner 74. The first tape guide positioner is configured to be an active positioner by providing the tape drive with a sensor 150 which is configured to determine the vertical position of the tape "T" with respect to the tape head 56. The sensor 150 provides a signal relative to the tape position to control device 76, which in turn provides a control signal to the first tape guide positioner 72. The operation of the these components to produce active positioning of the first tape guide is described more fully below. The second tape guide positioner can also be made active in a similar manner, as will also be described more fully below.

Figure 5:
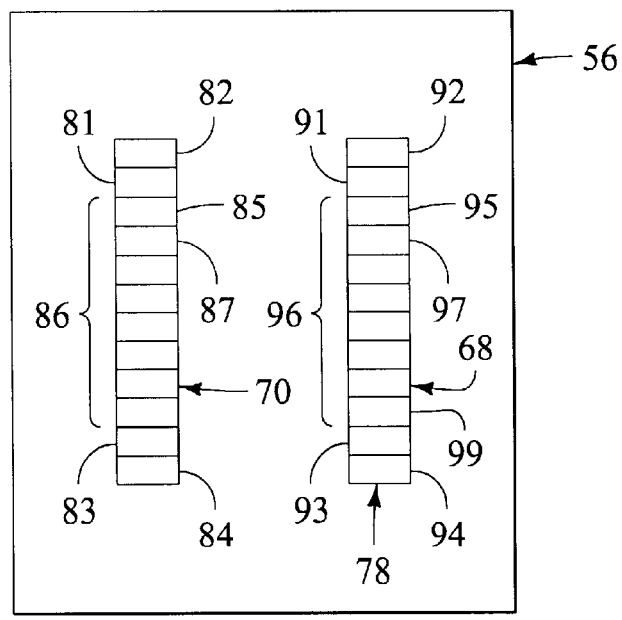
FIG. 5 shows a detail of a tape head which can be used on a tape drive incorporating the present invention.

Turning now to FIG. 5, a front elevation view detail of a tape head 56 that can be used in a tape drive incorporating the apparatus of the present invention is shown. The tape head comprises a first tape element array 68, and can further comprise a second tape element array 70. As shown, the element array 68 comprises 12 elements which are configured to either or both magnetically encode data onto a magnetic tape, or read magnetically encoded data from a magnetic tape. In the example shown, the middle eight elements 96 are specifically dedicated to the function of reading and writing the primary data on the tape, which data a user wishes to access or record for subsequent use. The uppermost two elements 91 and 92, and the lowermost two elements 93 and 94, can be designated as control elements. The control elements can be used to provide a signal to the tape drive to indicate the position of the tape with respect to the tape head. While the tape head 56 of FIG. 5 is shown with control elements 91 through 94, these are not necessary for the invention, but can be used in conjunction with the invention, as described further below. Further, the number of data elements does not have to be eight, but can be as few as 1, or more than eight. The second element array 70 can be configured similar to the first element array 68.

Figure 6:
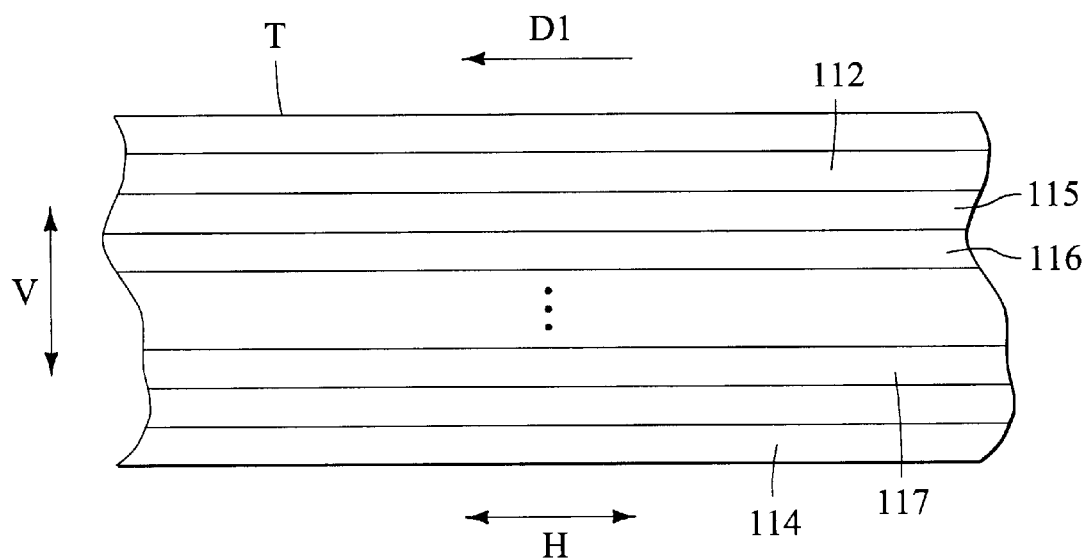
FIG. 6. shows a section of a magnetic recording tape and depicts how data can be recorded in tracks on the tape.

Turning now to FIG. 6, a front elevation view is shown of a section of magnetic tape "T". FIG. 5 should be viewed in conjunction with FIG. 6 in the following discussion. It should be understood that FIGS. 5 and 6 are not to scale with one another. As the tape moves in direction D1 across the face of the tape head, the uppermost data element 95 can write or read data on the tape in the first data channel or track 115. Likewise, the second data element 97 can write or read data on the tape in the second data channel or track 116, and the data element 99 can write or read data on the tape in the last data channel or track 117. In between tracks 116 and 117 are data tracks (not indicated) for data elements between elements 97 and 99. As the tape moves in the primary, or horizontal direction (indicated by arrows "H" and D1), the tape can be essentially continuously processed by a head element, thus resulting in the "lines" or channels of data shown on the tape in FIG. 6.

In a data recording mode, it can be advantageous to immediately confirm that data written to the tape was correctly written. Accordingly, when the first array is functioning in a data recording mode, the second array can be configured to operate in a data reading mode. Through the use of short term computer memory, for example, data immediately recorded onto the tape by an element in the first array can be saved, and compared with the data read from the associated element in the second array. If the data is identical, the indication is that the data was correctly recorded. If the compared data is not identical, then the tape drive can be configured to indicate to an operator that a data recording error has occurred. Alternately and more typically, through the use of a microprocessor the mis-recorded data is identified on the tape as such, and the data is re-recorded. It is thus important that the tape track in a straight line as it is moved across the tape head elements, so that corresponding elements in each element array are accessing the same data track. However, it can occur that a magnetic tape can become "tilted", that is, the tape rotates such that it acquires a small vertical component to its direction of travel. For example, the tape segment shown in FIG. 6 can be rotated slightly in either the clockwise or counterclockwise direction. When this occurs, it is possible for a data channel on the tape to become misaligned. By way of example, if the tape is rotated slightly in the counterclockwise direction, then data recorded onto the tape by the first array first data element 95 can pass across second array second data element 87, rather than element 85, as intended. In current prior art tape drives, a misalignment of 6 minutes (i.e., one-tenth of a degree of rotation) can cause a misalignment of a data track. The present invention can track and correct such "tape tilt", as will be further described below.

Returning to FIG. 5, as mentioned previously the element arrays can also be provided with control elements 91 through 94 (for array 68), and control elements 81 through 84 (for array 70). These elements can be used when an active head positioning device is used to track tape wander, as was described in the background section above. However, as also described, such tape-wander tracking devices are limited in that they are incapable of tracking the head to the tape when the tape makes radical changes in position, as for example when the edge of the tape contacts a flange on a tape guide and "jumps" back onto the tape guide. The present invention, in one embodiment, can replace active head tracking with active tape guide positioning, and consequently these control elements can be eliminated. In another embodiment, the active tape guide positioning can supplement active head tracking. Accordingly, the functioning of the control elements will now be discussed, so that it can be understood how they function with the present invention.

In one implementation, the tape is recorded with a single upper, and a single lower, tracking channel, for example, tracks 112 and 114 on tape "T" of FIG. 6. When the tape is correctly aligned, that is, approximately centered with the tape head, then upper control elements 81 and 91 read the control data track 112, and the lower control elements read the control track 114. When the track is centered on the control element, a nominal voltage on the on the control track is detected by the control element. If the tape begins to drift or wander in a first selected direction (either up or down), the voltage increases from the nominal voltage. If the tape begins to drift or wander in the other direction (either down or up, respectively), then the voltage decreases from the nominal voltage. This directional increase or decrease in the nominal voltage is detected by the control track. When this occurs, the head position controller can be configured to move the head in an upward or downward direction until control elements 81 and 91 are once more reading the nominal voltage on the control track. Control elements 92, 82, 94 and 84 can be provided as back-up elements in the event of a failure of the adjacent control elements.

Figure 1:
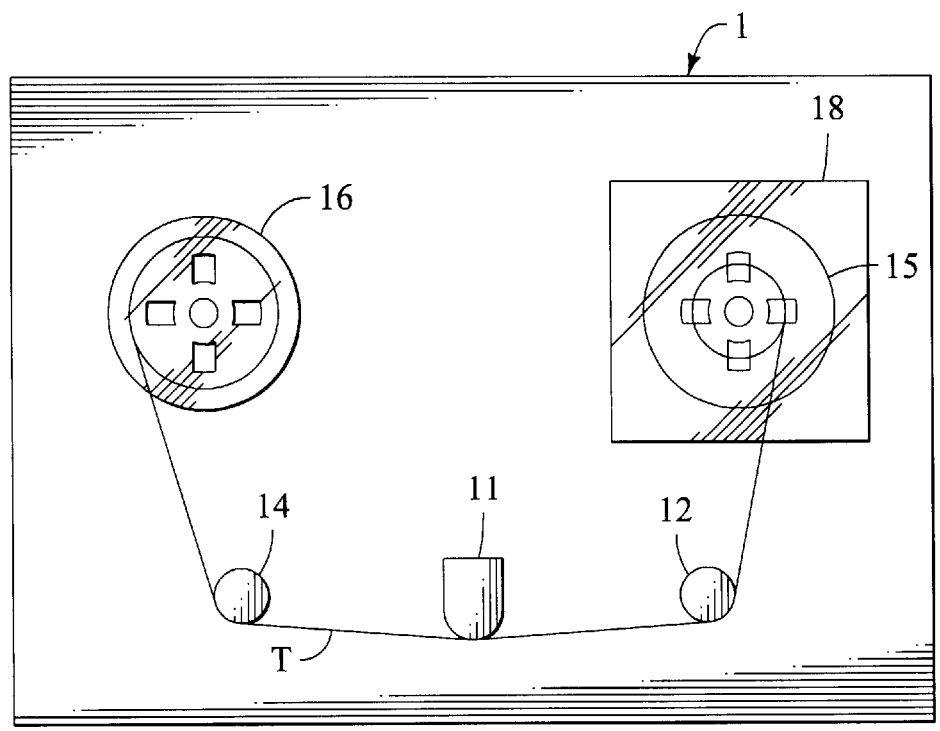
FIG. 1 depicts a plan view of a prior art tape drive.
Figure 2:
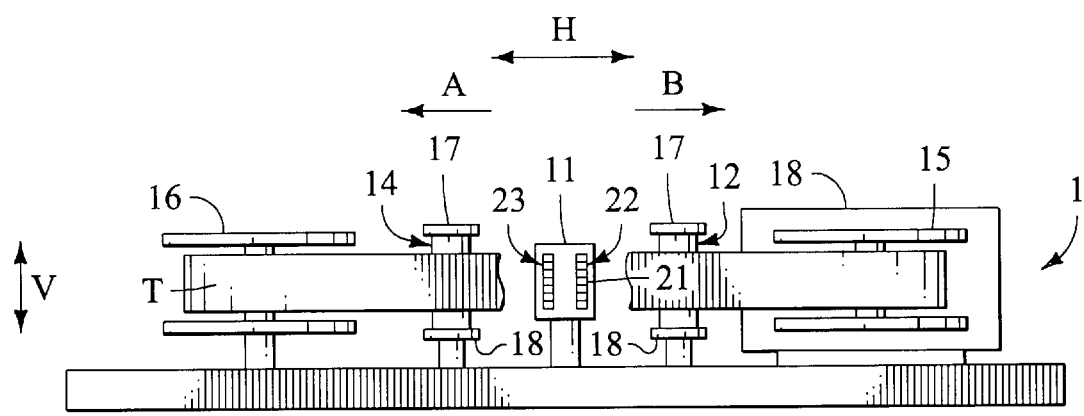
FIG. 2 depicts a front elevation view of the prior art tape drive of FIG. 1.
Figure 7:
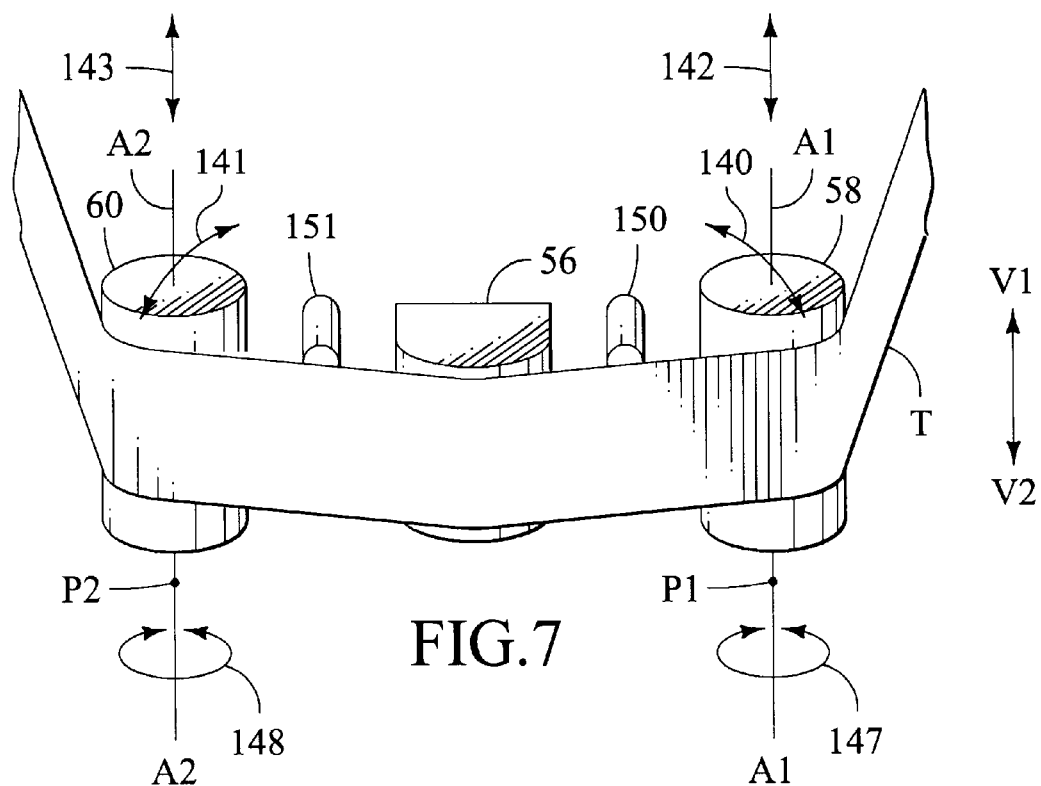
FIG. 7. shows a oblique view of a detail of the tape head and tape guide section of the tape drive of FIG. 3.

Turning now to FIG. 7, an oblique view of the tape head section of the tape drive 50 of FIG. 3 is shown. Adjacent a first side of the tape head 56 is a first tape support guide 58, which is mounted along the primary longitudinal axis A1. When the tape guide 58 is a roller-type tape guide, the roller rotates about the primary axis A1 in the direction shown by arrow 147. Adjacent a second side of the tape head is a second tape support guide 60, which is mounted along the primary longitudinal axis A2. When the tape guide 60 is a roller-type tape guide, the roller rotates about the primary axis A2 in the direction shown by arrow 148. In the present invention, at least one tape guide is actively positionable. The second tape guide can be absent, or it can be passive, and merely support the tape as the tape "T" is transported past the tape head 56. The tape guides 58 and 60 are shown without upper and lower flanges, unlike the tape guides 12 and 14 of the prior art, shown in FIG. 2. This is due to the fact that the active tape guide positioning will prevent the tape from moving to the extreme edges of the tape guides, and there is thus no need to provide a flange to prevent the tape from running off of the ends of the tape guide. Alternately, upper and lower tape guide flanges can be provided to facilitate threading of the tape across the tape head and onto the take-up reel. However, when tape guide flanges are provided in the present invention, they are preferably spaced much farther from the center of the tape than are prior art tape guide end flanges.

Figure 8:
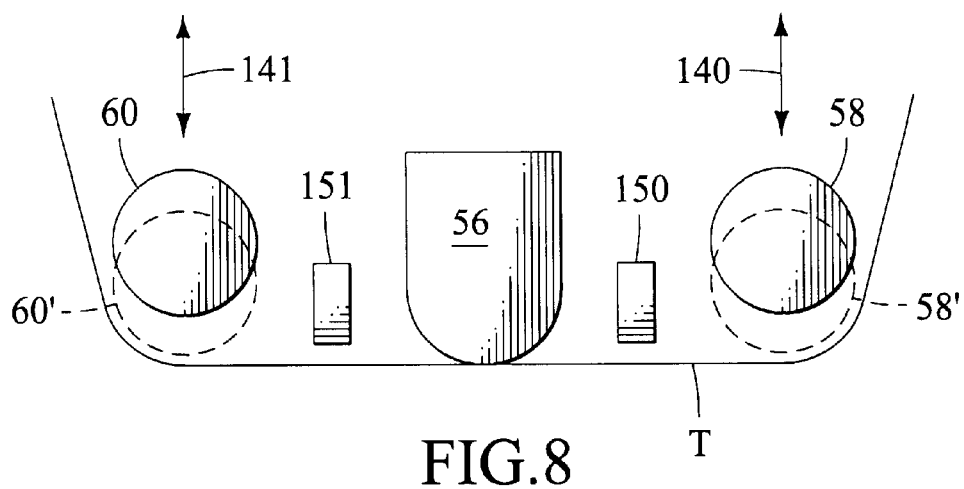
FIG. 8 is a simplified plan view of the detail section shown in FIG. 7.

In a first embodiment of the invention, a first tape guide, for example, tape guide 58,can be configured to be positionable by pivoting or tilting the tape guide, preferably in a direction towards or away from the tape, as indicated by arrow 140. In the example shown, the tape guide tilts about lower support point P1. Tape guide 58 can in fact be configured to pivot or tilt about any point along the primary axis A1, or even a point off of the axis. Turning briefly to FIG. 8, which is a plan view of the detailed tape head section shown in FIG. 7, when the tape guide 58 is pivoted towards the tape, the upper part of the tape guide moves from the position shown to the position 58'. This will cause the upper portion of the tape guide 58 to move towards the upper portion the tape "T", which will increase the tension in the upper part of the tape at the tape guide. When the tape is flying over the tape guide (i.e., the tape is not in contact with the tape guide), this localized increase in tape tension will cause the tape to move in the direction of the area of low tension, that is, in an downwards vertical direction, V2 of FIG. 7. Preferably, the pivoting of the tape guide 58 is controlled by an active positioner control device, which will be described further below. In this manner the tape can be made to move up and down in the vertical direction, and thereby track tape wander. The second tape support guide 60 can also be configured to pivot towards or away from the tape in the direction of arrow 141, in the manner just described for the first roller 58.

In a second embodiment of the invention, the first tape support guide 58 can be configured to be positionable by translating the tape guide along the primary axis of rotation A1 in the vertical direction indicated by arrow 142. Such translational movement can either be in the "up" direction (direction V1), or the "down" direction (direction V2). This has the effect of causing the tape "T" to move in the same direction as the translational movement of the tape guide, i.e., to "follow" the tape guide's vertical movement. The vertical movement of the tape as a result of vertical movement of the tape guide is enhanced when contact forces exist between the tape guide and the tape. It is possible for a tape to move over a support tape guide, and never actually contact the tape guide. In such instance, a thin layer of air forms between the tape guide and the tape, and the forces between the tape guide and the tape may be insufficient to allow the tape to follow the tape guide as the tape guide moves in the vertical direction. Therefore, preferably the tape is in physical contact with the tape guide. To increase the probability that the tape will be in physical contact with the tape guide, the surface of the tape guide can be texturized, or covered with a coating, which is intended to increase contact between the tape and the tape guide. Another method to increase the probability of contact between the tape and the tape guide is to add grooves to the tape guide. Further, the tension of the tape as it moves across the head can be adjusted to bring the tape closer to the tape guide, as for example by imparting a greater resistive force to the supply reel as tape is wound onto the take-up reel. Preferably, the translational movement of the tape guide 58 is controlled by an active positioner control device, which will be described further below. In this manner the tape can be made to move up and down in the vertical direction, and thereby track tape wander. The second tape support guide 60 can also be configured to translate the tape guide in the vertical direction indicated by arrow 143, in the manner just described for the first tape guide 58.

Since translational positioning of the tape guides can, under certain circumstances, result in the tape "walking off" of the upper or lower edge of the tape guide, it is preferable to combine translational positioning of the tape guides with pivoting positioning of the tape guides, as discussed further below. In this manner the direction of travel of the tape can be reversed to keep the edge of the tape away from the edge of the tape guide. Alternately, or in addition, the tape guides in a translational-positioning configuration can be provided with upper and lower flanges which are configured to prevent the tape from "walking off" of the upper or lower edge of the tape guide.

In one variation of the embodiment of the present invention wherein the tape guide translates to move the magnetic tape, the tape guide can be provided with "tight" upper and lower flanges which essentially constrain the tape between the tape guide flanges. When the tape guide is translated, the upper or lower flange itself exerts a respective downward or upward force on the edge of the tape, causing the tape to follow the movement of the tape guide. When "tight" flanges are used as described, it is not as important to generate a frictional contact force between the tape guide surface and the tape, since the necessary forces are applied by the tape guide flanges, and not by the tape guide surface. To reduce the possibility of damage to the outer edges of the tape from forces applied by "tight" flanges, the transition from the tape guide surface to the tape guide flange can be provided with a slight radius. This will cause the outer edges of the tape to flex outward slightly when impacted by the tape guide flange, rather than to buckle in an accordion-like manner.

Figure 9:
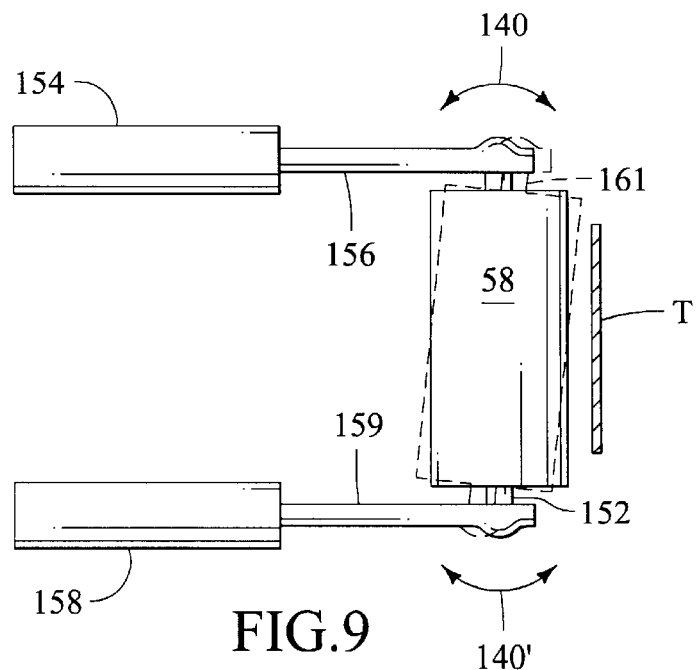
FIG. 9 depicts a simplified side view of a tape guide tilt positioner for positioning a tape guide in accordance with the present invention.

Turning now to FIG. 9, one means for implementing a pivoting or tilting tape guide configuration is shown. The configuration differs from that shown in FIG. 8, wherein the tape support guide 58 pivoted about the lower point P1, corresponding with the lower edge of the tape "T". In FIG. 9, the tape guide 58 is configured to pivot about the midpoint of the tape guide, corresponding to the approximate midpoint of the tape itself. That is, in addition to moving about upper mount 161 as indicated by arrow 140, the lower end of the tape guide 58 can move about mounting 152 as well, as indicated by arrow 140'. The advantage of the configuration shown in FIG. 9 over that shown in FIG. 7 is that it is easier to exert a force on the lower edge of the tape with the tape guide, since the tape guide of FIG. 9 can move into the lower edge of the tape, whereas the tape guide of FIG. 7 cannot. The configuration shown in FIG. 9 can be achieved by providing the tape guide 58 with an upper tilt positioner and a lower tilt positioner. The upper tilt positioner comprises an upper arm 156 which is connected to the upper mount 161 of tape guide 58, and an upper actuator 154. The lower tilt positioner comprises a lower arm 159 which is connected to the lower mount 152 of tape guide 58, and a lower actuator 158. The tape guide is moveably supported within bearings in the upper and lower arms. The actuators act in concert to move the control arms an equal amount in opposite directions, thus causing the tape guide 58 to pivot about a central point between the two actuators. The tilting of the tape guide 58 is shown by the dashed outline of the tape guide, which is exaggerated merely for illustrative purposes. In one variation, the lower actuator 158 can be replaced with a passive follower, thus eliminating the need for a second actuator. One example of a passive follower is a sliding rail configuration, wherein the moveable arm 159 slides on a fixed rail (not shown). The actuation of the tilt positioners will be described more fully below.

Figure 10:
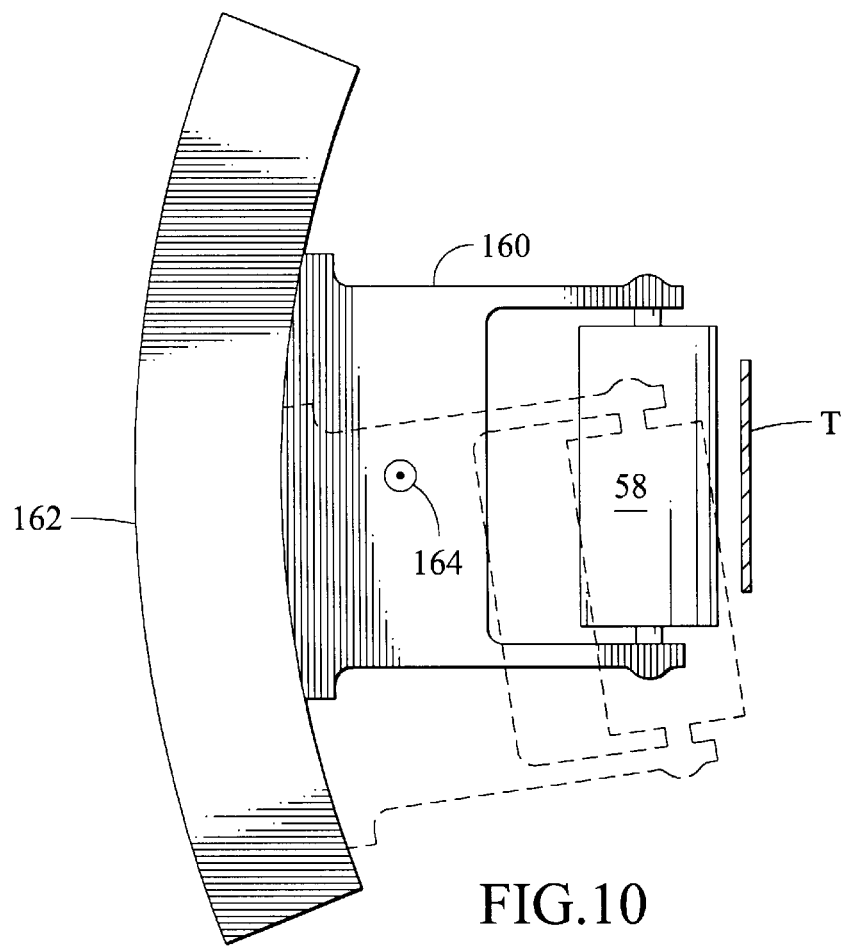
FIG. 10 depicts a simplified side view of a tape guide translation positioner for positioning a tape guide in accordance with the present invention.

FIG. 10 shows one means for implementing the second embodiment of the present invention wherein the tape support guide 58 is configured to translate vertically with respect to the tape "T", as well as pivot at the same time. The tape guide 58 is supported in bearings on its upper and lower ends in a support bracket 160. The support bracket 160 comprises the rail in a linear servo motor. The bracket 160 is slidably mounted to the body 162 of the linear motor. The linear motor body 162 is supported by the chassis of the tape drive and remains fixed with respect to the tape. The support 160 can be moved in an upwards or downwards direction (the downward direction being indicated by the exaggerated dashed line) as a result of forces imparted to it by the linear drive motor body 160 to cause the tape guide 58 to move in the same direction. Forces exerted on the tape by the tape guide thus cause the tape "T" to move in either an upwards or a downwards direction. As a result of the curvilinear body 162 of the actuator, the tape guide 58 is moved both translationally and in a pivoting manner when the support bracket is moved along the body 162. The support bracket 160 can be supported about a neutral balance point 164 such that movement of the linear motor body as a result of shock or vibration to the tape drive chassis will not affect the position of the tape guide with respect to the tape. The translational positioner can be configured to be an active positioner by activating the linear drive motor in response to the detection of tape wander, as more fully descried below. In this manner, the translational positioner can be used to correct the tape position to correct for tape wander.

In one variation on the apparatus shown in FIG. 10, the linear motor body is straight, and not curvilinear. This results in the tape guide 58 being moved purely in a translational direction, versus the combined translational and pivoting movement shown.

Figure 14:
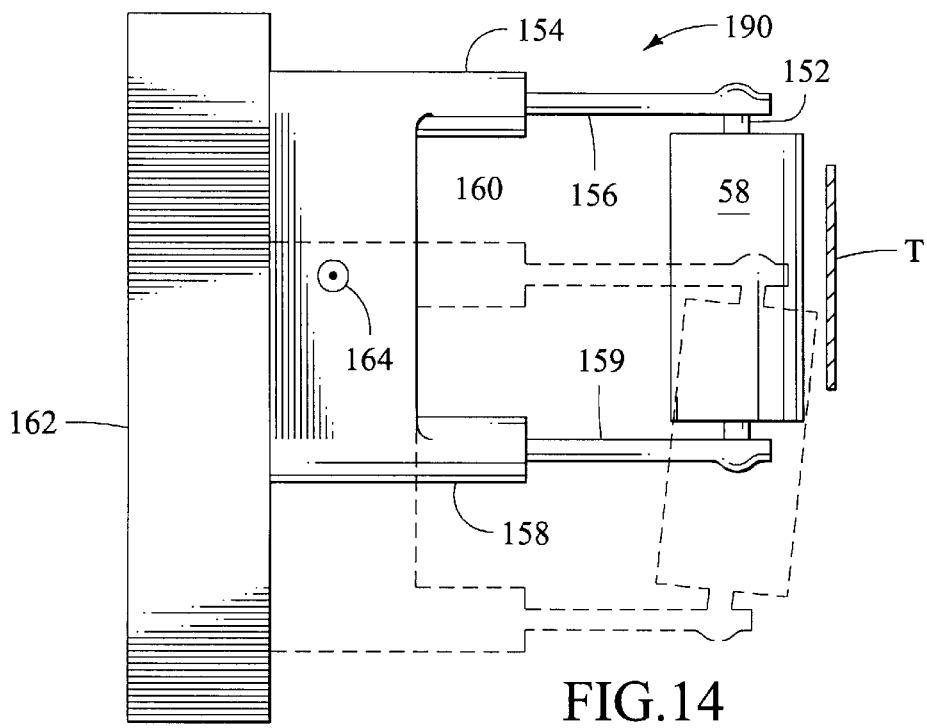
FIG. 14 depicts a simplified side view of a tape guide positioner for positioning a tape tape guide in accordance with the present invention which combines both tilt positioning and translational positioning of the tape guide.

FIG. 14 shows how the tilt positioner of FIG. 9 can be incorporated with the translational positioner of FIG. 10 to provide a combined tilt/translational tape guide positioner 190. In the device shown in FIG. 14, the tilt position actuators 154 and 158 are incorporated into the arms of the linear motor slide 160. As the linear motor slide moves along the rails of the linear motor body 162 to move the tape guide vertically, the tape guide can also be pivoted, as indicated by the dashed outline of the tape guide, which shows exaggerated repositioning of the tape guide for purposes of illustration.

In one implementation of the first embodiment of present invention, a tape drive is provided with at least one tape guide tilt positioner, which comprises a relatively low bandwidth actuator such as a stepper motor. This allows relatively slow tape wander to be compensated for by relatively slow repositioning of the tape guide. In this implementation, the tape head can be provided with a tape head positioner which allows the head to track slow vertical movements of the tape. The combined positioning of the tape guides and the tape head can be controlled by an electronic controller, which can be configured to prevent an unstable system by means known in the art for the design and construction of control systems.

In one implementation of the second embodiment of present invention, a tape drive is provided with at least one tape guide translation positioner, which comprises a relatively high bandwidth actuator such as a linear motor. This allows relatively fast tape wander to be compensated for by relatively rapid repositioning of the tape guide. In this implementation, a tape head positioner can be eliminated, since the tape guide translation positioner is capable of quickly correcting tape wander.

A third embodiment of the present invention comprises a tape drive which incorporates a tape guide tilt positioner in accordance with the first embodiment and as described above, as well as a tape guide translational positioner in accordance with the second embodiment, also described above. Preferably, the tape drive is provided with two tape guides disposed one on each side of the tape head. The two tape guides can then be independently tilted to thereby allow horizontal tilt in the tape to be corrected, as discussed above and described more fully below. Also preferably, the two tape guides are translationally positionable by a single tape guide translational positioner. In this manner, the tape support guides can be actively positioned to cause the tape to track tape wander, and they can also be positioned to correct for tape tilt out of the horizontal plane. A plan view of a section of a tape drive in accordance with the third embodiment of the present invention is shown in FIG. 15.

Figure 15:
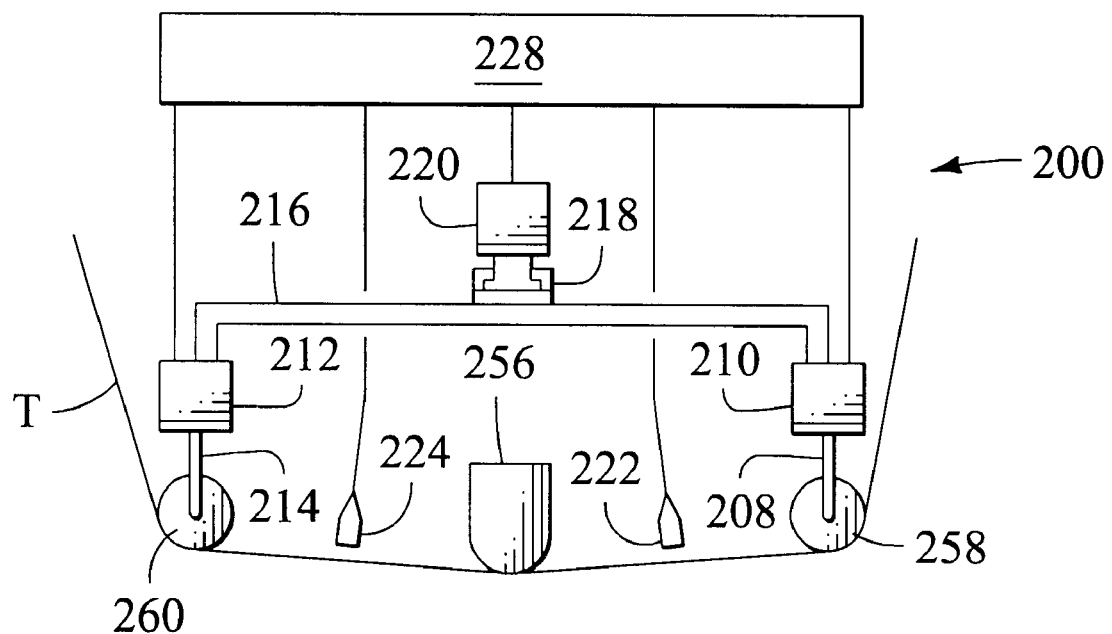
FIG. 15 shows a plan view detail of a tape head section of a tape drive incorporating both tape guide tilt positioners and a tape guide translational positioner, in accordance with one embodiment of the present invention.

The tape drive tape head section 200 of FIG. 15 has a tape head 256 for reading a magnetic tape "T", a first tape support guide 258 supported adjacent a first side of the tape head, and a second tape support guide 260 supported adjacent a second side of the tape head. The first tape guide 258 is provided with a tilt positioner 210 which is attached to the tape guide 258 by positioner control arm 208. The second tape guide 260 is provided with a tilt positioner 212 which is attached to the tape guide 260 by positioner control arm 214. Tilt positioners 210 and 212 can be servo stepper motors or linear motors. Tilt positioners 210 and 212, and consequently tape guides 256 and 260, are commonly supported by a coupler or frame 216. Coupler 216 has a linear drive motor rail 218 attached thereto, which is mounted to linear drive motor body 220. Linear drive motor can thus vertically reposition both tape guides simultaneously. The tape drive is further provided with a first tape position sensor 222, which is preferably disposed between first tape guide 258 and tape head 256, and a second tape position sensor 224, which is preferably disposed between second tape guide 260 and tape head 256. Sensors 222 and 224 provide tape vertical position information to a controller 228, which is configured to process the information and determine if the tape has moved outside of predefined position parameters. If the controller determines that one or both tape guides need to be repositioned to cause the tape to move back inside the predefined parameters, then the controller sends a control signal to the appropriate positioners to reposition the tape guides in the manner described above and more fully below. The controller can be implemented, for example, using discrete electronic components or a microprocessor and well known control circuit design principles.

Figure 11:
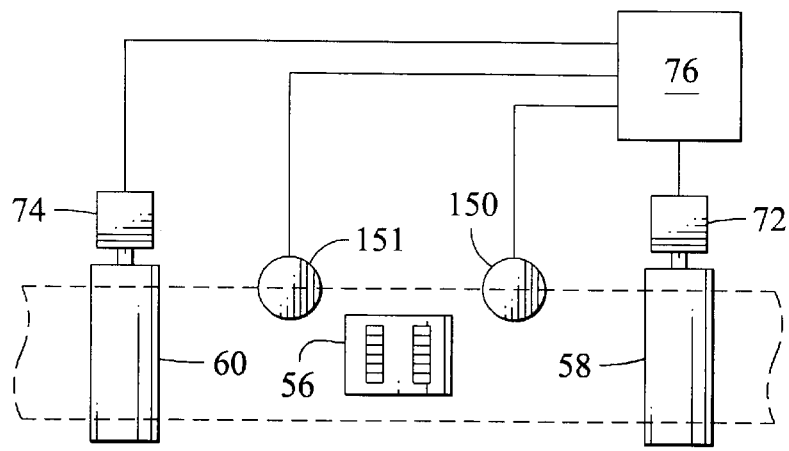
FIG. 11 depicts a simplified schematic of a control mechanism used to actively position two tape support guides in accordance with the present invention

Turning now to FIG. 11, a schematic of one embodiment of a control scheme for actively controlling a tape guide positioner, in accordance with the present invention, is shown. The tape guide position control assembly shown is configured to actively, and independently, position first tape support guide 58 via positioner 72, and second tape support guide 60 via positioner 74. It is under stood that the position control assembly can be configured to position only tape guide 58, or only tape guide 60. Also, the position control assembly can be configured to actively position both tape guides 58 and 60 via a single positioner by mechanically coupling the two tape guides. It is also understood that the positioners can be tilt positioners, translational positioners, or a combination of the two. For example, positioner 72 can be a tilt positioner, while positioner 74 can be a translational positioner. Further, each tape guide can be provided with a combined translational and pivoting positioner, such as the type shown in FIG. 14.

Each tape positioner can be provided with a dedicated tape position sensor. The sensor(s) provide signal information to a controller 76, which is configured to process the signal(s) and determine if the tape has moved as a result of tape wander. If the controller 76 determines that tape wander has occurred, then the controller 76 can direct a control signal(s) to the positioner(s) to correct the tape position. In the example shown, positioner 72 has associated tape position sensor 150 located adjacent a first side of tape head 56, while positioner 74 has associated sensor 151 located adjacent a second side of the tape head. While a single sensor can be employed for both positioners, it is preferable to have a dedicated sensor proximate to each tape guide which is being actively positioned. Sensors 150 and 151 can also be seen in FIGS. 7 and 8. The sensors can comprise any known or future means for detecting the position of the tape. In one embodiment, a sensor comprises a charge couple device ("CCD"). The CCD sensor element comprises a matrix of sensor elements (not shown). In FIG. 11, the outline of a tape is shown in elevation view with respect to the location of the sensors. When the tape is correctly aligned with the head, certain of the sensor elements are in direct line of sight with the tape, while other sensor elements are above the upper edge of the tape. A light source can be provided which is directed towards the matrix of sensor elements. Those elements above the edge of the tape will be exposed to the light, while those elements below the upper edge of the tape will not. Information from the sensor is provided to the controller as an electronic signal or signals.

When the tape head is provided with tape position sensors, for example, sensor elements 91 through 94 and 81 through 84 of the tape head 56 shown in FIG. 5, then the separate sensors 150 and 151 of FIG. 7 are not required. Sensor elements 91 through 94 and 81 through 84 work in the manner described above to detect a drop in voltage detected from the control track of the tape, indicating that the tape is moving off-center from the sensing element.

As the tape is moved across the face of the tape head in the primary direction of tape travel, the tape can wander in the vertical direction. If, for example, the tape wanders in the downward direction, then an element or elements in the CCD array which were not previously blocked from the light will be exposed to the light. Alternately, if tape head control elements are being used, then the drop in voltage as the control track of the tape moves off center from the control element will detected. In either event, this information is provided to the controller 76, which can actuate one or more tape guide positioners to cause the tape guides to be repositioned (in the manner described above) to thereby move the tape in an upward direction to correct for the tape wander.

Tape tilt, i.e. a slight rotation of the tape out of the horizontal plane of travel (assuming the tape travels primarily in a horizontal direction) can be corrected for using the tape guide positioners 72 and 74 to reposition the tape to travel in the correct direction. One means for detecting tape tilt is to use a tape head such as that shown in FIG. 5, where in the tape head is provided with upper and lower tape position sensor elements 91 through 94, and 81 through 84. For example, if upper sensor element 91 of array 68 detects the nominal voltage from the control track of the tape, yet upper sensor element 81 of array 70 detects an increase or decrease in the nominal voltage as the control track moves off center from the element 81, then the tape has tilted counter-clockwise from its orthogonal direction of travel. Signals from the tape position sensing elements can then be provided to the controller 76 of FIG. 11 to cause the actuators 72 and 74 to move the left side of the tape in an upwards direction, and the right side of the tape in a downwards direction, thus resulting in a clockwise rotation of the tape to bring it back into horizontal alignment, which is determined when both control elements (e.g., elements 81 and 91) are detecting the nominal voltage from the control track.

Tape tilt can also be detected using the two-CCD sensor array configuration shown in FIG. 11. Tape tilt is identified when a sensor element in one sensor does not change states, but a sensor element in the other sensor does change states. If tape tilt is detected by the controller 76 based on signals from the sensors 150 and 151, then the tape guide positioners 72 and 74 can be actuated to reposition the tape. Tape tilt can also be detected by a single CCD sensor array, but two CCD sensors will provide a much more sensitive tape tilt detection configuration.

In yet another embodiment of the present invention, an actively positionable tape guide can be used to control the spooling of magnetic tape onto a take-up reel. As describe above, when magnetic tape is wound onto a take up reel, the outer edges of the tape can come into contact with the upper or lower flange of the tape reel. This can cause damage to the tape, and so it is preferable to center the tape on the tape reel between the flanges of the reel. However, if the magnetic tape is perfectly aligned in the vertical direction when it is wound onto one of the tape reels, the slightly thicker outer edges of the tape can "pile up", resulting in a crinkling effect at the edge of the tape. Both of these problems can be addressed simultaneously using actively positionable tape guides. In the first instance, the actively positionable tape guides can be used to steer the tape clear from the tape reel flanges. This can be assisted using a sensor system to detect when the tape is approaching the upper or lower flange. When encroachment of the tape edge on the flange is detected, the tape can be directed in the opposite direction away from the flange. Likewise, a slight intentional "wander" can be imparted to the tape by the actively positionable tape guides to cause the tape to move about the center of the take up reel, thus preventing piling up of the tape edges. This selective "wander" can follow a periodic or a random function, and can be controlled by a control algorithm which drives the tape guide positioners. In one variation the actively positionable tape guides can be configured to both keep the edge of the tape away from the tape reel flanges, and to selectively vary the tape position about the center of the take up reel.

In a further variation of the invention, a tape drive apparatus can be provided with a plurality of actively positionable tape guides to accomplish any or all of the above described objectives. For example, a first set of first and second actively positionable tape guides can be provided proximate the tape head (one on each side of the tape head, for example) to correct for tape wander. A second set of actively positionable tape guides can be provided proximate the tape spools (one guide proximate to the source reel, and one tape guide proximate the take up reel, for example), to insure that the tape does not contact the edges of the tape reels as it is wound onto each reel. Further, the actively positionable tape guides proximate the tape head can comprise a first translational tape guide and a first tilt-positionable tape guide adjacent a first side of the tape head, and a second translational tape guide and a second tilt-positionable tape guide adjacent a second side of the tape head.

The present invention further includes methods for actively positioning a magnetic tape with respect to a tape head. The tape head has head elements for at least performing one of writing or reading magnetically encoded data respectively to or from the magnetic tape, as described above. A first method of the invention includes the steps of providing a first tape guide aligned along a primary axis of rotation and disposed proximate a first side of the tape head. The tape is then moved across the first tape guide and the tape head in a primary direction while the first tape guide is pivoted, to thereby cause the tape to move in a secondary direction essentially perpendicular to the primary direction. In a second method of the present invention, rather than pivoting the tape guide, the tape guide is moved translationally along the primary axis of rotation of the tape guide while the tape is moved across the tape guide and the tape head, to thereby cause the tape to move in the vertical direction.

Figure 12:
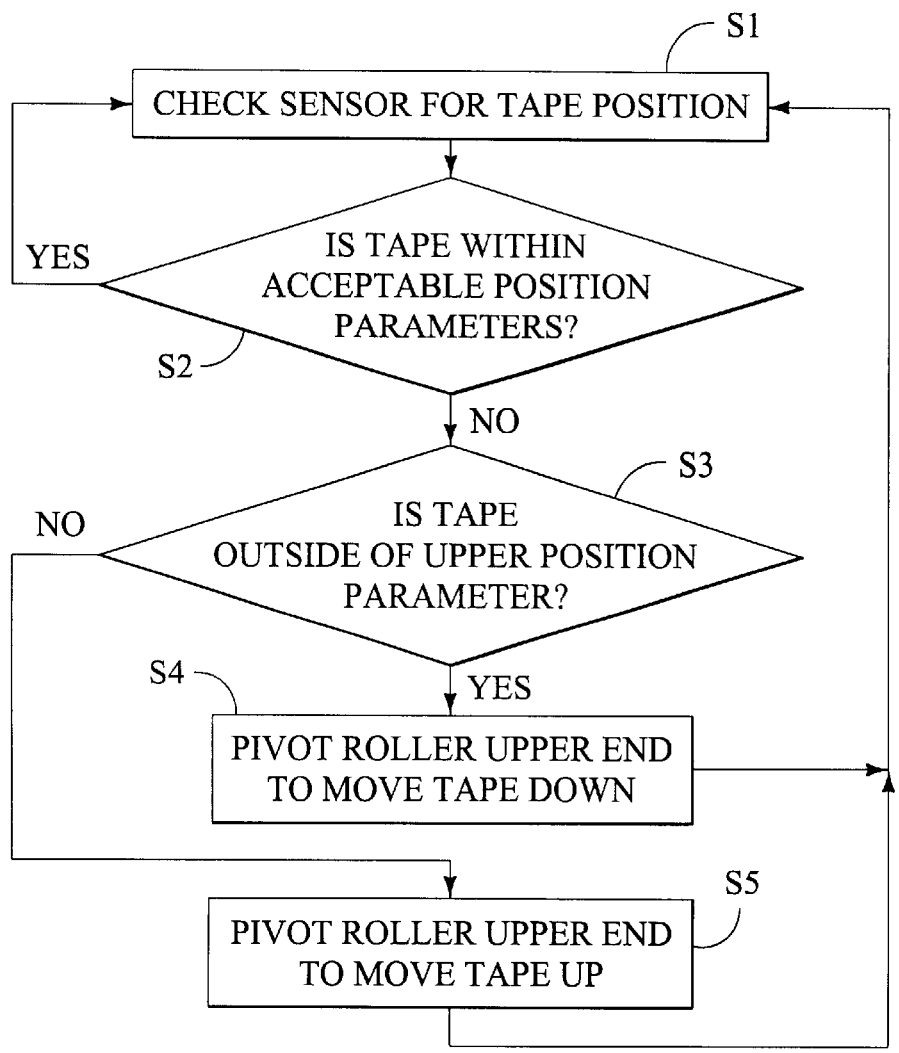
FIG. 12 shows a flow chart of a method for reducing wander in a tape using a single active positionable tape guide, in accordance with the present invention.

Turning to FIG. 12, a flowchart is shown which depicts a control scheme for implementing one method of the present invention. In step S1, the control mechanism (76 of FIG. 11) interrogates the sensors 150 and 151 for the present vertical position of the tape. At step S2, the control mechanism compares the detected vertical tape position to a set of predefined parameters for acceptable tape position to determine if the tape is within or outside of the parameters. The parameters can include not only the vertical position of the tape, but "tilt" of the tape out of the horizontal. In the example shown in FIG. 12, it is assumed that the controller only checks for vertical position, and not tilt. An example wherein the control mechanism checks for tape tilt is described further below. If the controller determines at step S2 that the tape is positioned within the parameters, then no correction is needed, and the controller returns to step S1 to poll the sensors again. However, if the control mechanism does determine that the tape is outside of the acceptable position parameters, then the controller acts to reposition the tape beginning at step S3.

At step S3 the controller determines whether the tape is above the upper position parameter. If it is, then at step S4 the controller actuates a roller position actuator to cause the tape to move in a downward direction. Thereafter, the controller returns to step S1 to poll the sensors and determine at step S2 if the adjustment of the roller position was sufficient to halt the tape wander and bring the tape back inside the envelope of acceptable position parameters.

If at step S3 the controller determines that the tape is not above the upper position parameter, then it must be that the tape is below the lower position parameter, and the control schema moves to step S5. At step S5 the controller actuates a roller position actuator to cause the tape to move in an upward direction.

The control algorithm incorporated by the controller (74 of FIG. 11) and used in the schema depicted by FIG. 12 can be an open loop or a closed loop control algorithm. Further, the incremental positional changes made in steps S4 and S5 can be fixed quantities, such that the controller continually adjusts the positioner and checks the tape position until the tape is correctly positioned. Alternately, if the sensors (150 and 151 of FIG. 11) are devices such as CCD arrays, then it is possible to determine not only that the tape is outside of parameters, but by how much (i.e., the magnitude of the error). The control signal to the positioner can then be scaled to the error to more quickly return the tape to its proper position. With sufficiently high resolution within a CCD sensor, it is also possible to determine the rate at which the tape is moving in one direction or the other. The control algorithm can then be configured to calculate the control signal based on the direction and size of the tape alignment error, as well as the rate of change in the error.

Figure 13A:
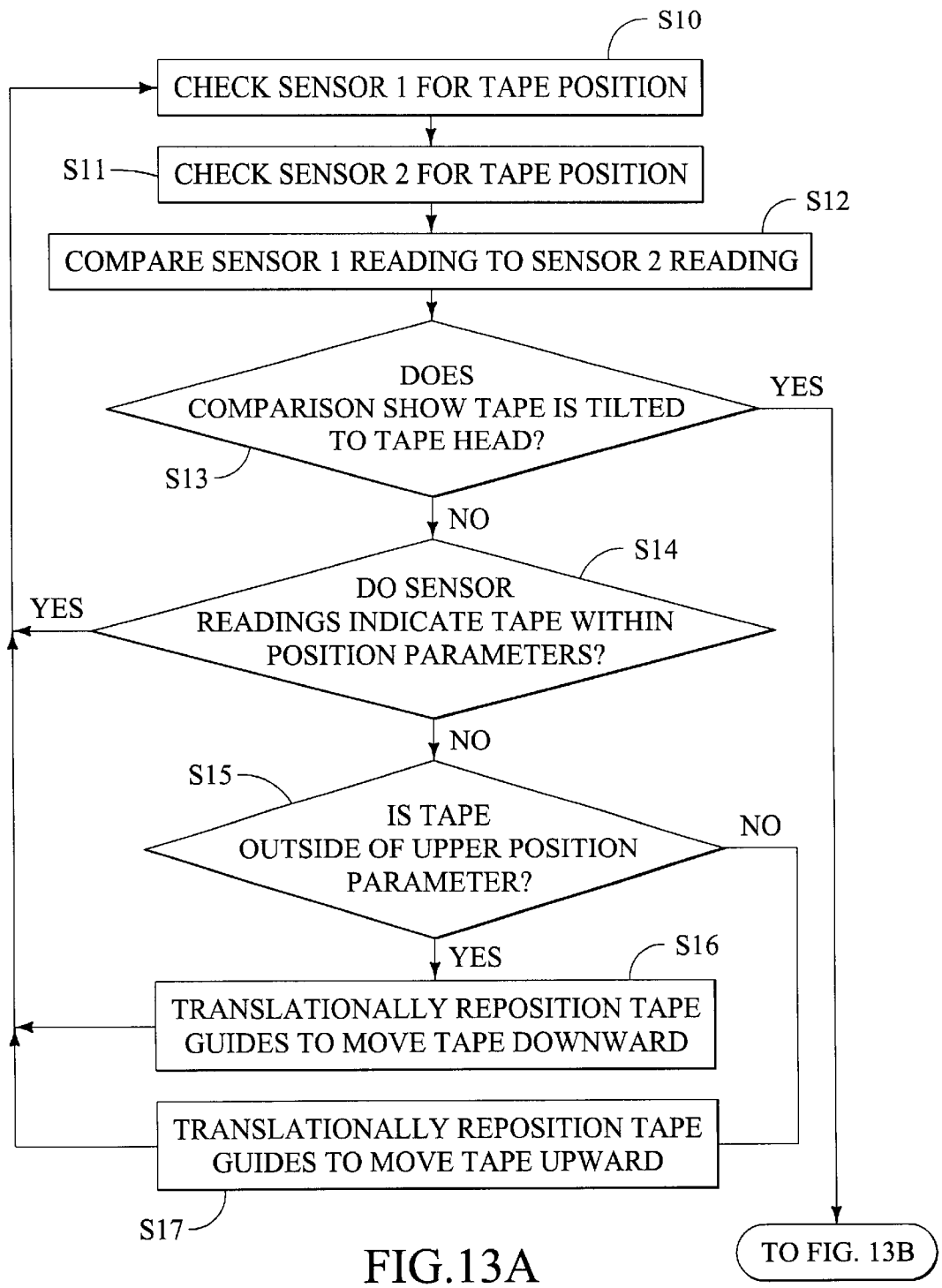
FIGS. 13A and 13B together show a flow chart of a method for reducing wander and correcting tape tilt in a tape using two active positionable tape guides, in accordance with the present invention.
Figure 13B:
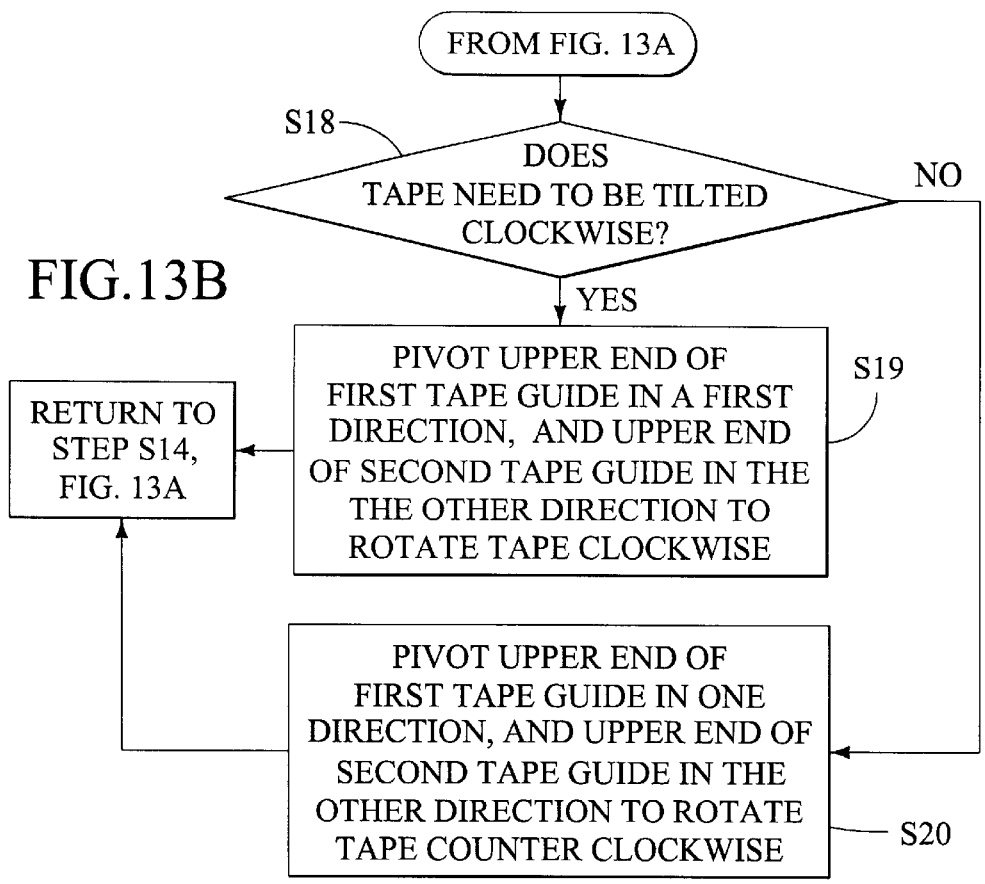

Turning now to FIGS. 13A and 13B, a flowchart is shown which depicts of a control scheme for implementing a second method of the present invention. The flowchart should be viewed in conjunction with FIG. 15, which was described above and which can be used to implement the second method of the invention. At step S10 of FIG. 13A, the controller 228 interrogates the sensor 222 for the tape position, and at step S11 the controller 228 interrogates the sensor 224 for the tape position. (As discussed above, tape tilt can also be determined by polling tape position sensors in the tape head itself.) The two sensor readings are compared at step S12. This comparison is performed to determine if the tape is "tilted" with respect to the tape head, i.e., that the tape is not tracking straight across the face of the tape head 256. (A technique for determining "tape tilt" was described above.) At step S13, the controller acts on the results determined in step S12. If tape tilt is present, the tilt is corrected in steps S18 through S20, which will be more fully described below. If no tape tilt is present, the controller checks for, and corrects if necessary, tape wander in steps S14 though S17.

Turning to FIG. 13B, if tape tilt is detected at step S13, the controller determines at step S18 whether the tilt is in the clockwise or counter-clockwise direction, and in which direction the tape needs to be moved or rotated (counter-clockwise or clockwise, respectively) to correct for the tilt. If the tape needs to be corrected in a clockwise direction, then at step S19 the tape guide tilt positioners 210 and 212 are actuated to cause the tape to rotate in a clockwise direction. Thereafter, the controller returns to step S14 of FIG. 13A to correct for any vertical error (tape wander) in the tape position, as described further below. If it is determined at step S18 that the tape needs to be corrected in a counter-clockwise direction, then at step S20 the tape guide tilt positioners 210 and 212 are actuated to cause the tape to rotate in a counter-clockwise direction. Thereafter, the controller returns to step S14 of FIG. 13A to correct for any vertical error (tape wander) in the tape position, as described further below.

If at step S13 of FIG. 13A the controller determines that no tape tilt is present, then at step S14 the controller 218 determines from the sensor data acquired in steps S10 and S11 whether the tape is positioned within acceptable position parameters with respect to the tape head 256. If the tape is properly positioned, then the controller returns to step S10 to again interrogate the sensors 222 and 224. If, however, the tape is found to be positioned outside of the position parameters, then the controller moves to step S15 to determine whether the tape is positioned high or low with respect to the tape head. If the tape is positioned above the upper position parameter, then at step S16 the controller activates the translational positioner 220 to translate the tape guides 258 and 260 and move the tape downward by a predetermined distance. Thereafter, the controller returns to step S10. If it is determined at step S15 that the tape is positioned below the lower position parameter, then at step S17 the controller activates the translational positioner 220 to translate the tape guides 258 and 260 and move the tape upward by a predetermined distance. Thereafter, the controller returns to step S10.

As with the control scheme described above for FIG. 12, the control algorithm within the controller 228 for the control schema shown in FIGS. 13A and 13B can be configured in a number of different manners. The control system can be configured to be either an open loop control system, or a closed loop control system. The magnitude of the position signals sent to the positioners 210, 212 and 228 can be a constant, or they can be varied depending on the information available to the controller from the sensors 222 and 224, similar to the techniques described above for FIG. 12. Further, when a correction is made for tape tilt at steps S18 through S20, the position of the tape can be affected slightly. Consequently, when the controller returns to step S14 from either step S19 or S20, the tape position can be corrected based on the estimated tape movement as a result of the repositioning performed in either step S19 or S20. This can affect the size of the control signal sent to positioner 228 to make adjustments to the vertical position of the tape.

In one variation on the implementation shown in FIGS. 13A and 13b, the control schema can be performed by the apparatus shown in FIG. 8 wherein the tape guides do not translate, but only pivot or tilt. In this variation, at steps S16 and S17 of FIG. 13A, the tape is repositioned upward or downward by respectively by tilting the upper end of both tape guides 56 and 60 either away from or towards the upper edge of the tape "T".

It is to be appreciated that the methods disclosed above can be used not only to position magnetic tape with respect to a tape head, but also to guide magnetic tape onto a tape reel. In this way the tape can be spooled onto the reel and guided away from the outer flanges on the tape reel, thus removing the possibility of damage to the tape from the reel flanges. This application can be accomplished by using the sensor systems described above. Alternately, separate sensors located closer to the tape reels themselves can be used to determine the position of the tape as it is wound onto the reel. The methods disclosed above can also be used to slightly vary the position of the tape as it is wound onto the tape reel, to prevent the tape edges from aligning.

A further advantage of the present invention is that the methods and apparatus disclosed herein can be used ex-factory to align the tape guides and the tape head. This can be useful when the original factory alignment of the tape guides and the tape head comes out of alignment in the field. Alternately, factory alignment of the tape head and tape guides can even be eliminated, since such alignment can be performed by the active positionable tape guides.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for actively positioning a magnetic tape with respect to a tape head having head elements for at least performing one of writing or reading magnetically encoded data respectively to or from the magnetic tape, comprising:

providing a first tape guide aligned along a primary axis and disposed proximate a first side of the tape head; and moving the tape across the first tape guide and the tape head in a primary direction while pivoting the first tape guide about the primary axis to thereby cause the tape to move in a secondary direction essentially perpendicular to the primary direction.

2. The method of claim 1 further comprising translationally moving the first tape guide along the primary axis while moving the tape across the first tape guide and the tape head in the first primary direction to thereby further cause the tape to move in the secondary direction.

3. The method of claim 1 further comprising:

providing a second tape guide aligned along a second primary axis and disposed proximate a second side of the tape head opposite the first side of the tape head; and pivoting the second tape guide about the second primary axis while moving the tape across the second tape guide and the tape head in the primary direction to thereby further cause the tape to move in the secondary direction.

4. The method of claim 3 further comprising translationally moving the second tape guide along the second primary axis while moving the tape across the second tape guide and the tape head in the primary direction to thereby further cause the tape to move in the secondary direction.

5. The method of claim 1 further comprising detecting the position of the magnetic tape with respect to the tape head and ceasing pivoting of the first tape guide when the tape is in a desired selected position with respect to the tape head.

6. An apparatus for actively positioning a moving magnetic tape with respect to a tape head element in a tape head across which the moving magnetic tape is configured to move in a primary direction, comprising:

a first tape guide supported proximate to a first side of the tape head and mounted along a first tape guide axis, the first tape guide being configured to support the magnetic tape as the tape travels past the tape head;

a first tape guide tilt positioner configured to tilt the first tape guide about the first tape guide axis; and an active positioner control device configured to, in response to detection of wander of the moving magnetic tape, cause the first tape guide tilt positioner to tilt the first tare guide about the first tape guide axis as the magnetic tape is moved across the tape head and the first tape guide, to thereby cause the magnetic tape to move in a secondary direction which is essentially perpendicular to the primary direction.

7. The apparatus of claim 6, and further comprising a first tape guide translation positioner configured to translate the first tape guide along the first tape guide axis, and wherein the active positioner control device is further configured to position the first tape guide translation positioner in response to detection of wander of the moving magnetic tape.

8. The apparatus of claim 7, and wherein the first tape guide translation positioner comprise a first tape guide translation actuator configured to actuate the first tape guide translation positioner in response to an input signal from the active positioner control device, and wherein the first tape guide translation actuator comprises a high bandwidth actuator.

9. The apparatus of claim 7 and further comprising:

a tape head positioner configured to translationally move the tape head with respect to a magnetic tape being accessed by the tape head; and wherein the tape head positioner comprises a tape head positioner actuator configured to actuate the tape head positioner in response to a first input signal.

10. The apparatus of claim 6, and further comprising a second tape guide supported proximate to a second side of the tape head and mounted along a second tape guide axis, the second tape guide being configured to support the magnetic tape as the tape travels past the tape head;

a second tape guide tilt positioner configured to tilt the second tape guide about the second tape guide axis; and wherein the active positioner control device is further configured to position the second tape guide tilt positioner in response to detection of wander of the moving magnetic tape.

11. The apparatus of claim 10, and further comprising a first tape guide translation positioner configured to translate the first tape guide along the first tape guide axis; and wherein the active positioner control device is further configured to position the first tape guide translation positioner in response to detection of wander of the moving magnetic tape.

12. The apparatus of claim 11, and further comprising a second tape guide translation positioner configured to translate the second tape guide along the second tape guide axis, and wherein the active positioner control device is further configured to position the second tape guide translation positioner in response to detection of wander of the moving magnetic tape.

13. The apparatus of claim 6, and further comprising a second tape guide supported proximate to a second side of the tape head and mounted along a second tape guide axis, the second tape guide being configured to support the magnetic tape as the tape travels past the tape head;

a second tape guide translation positioner configured to translate the second tape guide along the second tape guide axis; and wherein the active positioner control device is further configured to position the second tape guide translation positioner in response to detection of wander of the moving magnetic tape.

14. The apparatus of claim 6, and wherein the first tape guide tilt positioner comprise a first tape guide tilt actuator configured to actuate the first tape guide tilt positioner in response to an input signal from the active positioner control device, and wherein the first tape guide tilt actuator comprises a low bandwidth actuator.

15. The apparatus of claim 6, and further comprising:
a tape head positioner configured to translationally move the tape head with respect to a magnetic tape being accessed by the tape head; and wherein the tape head positioner comprises a tape head positioner actuator configured to actuate the tape head positioner in response to a first input signal, and wherein the tape head positioner actuator comprises a high bandwidth actuator.

16. The apparatus of claim 6, and further comprising:
at least one sensor configured to determine the location of an upper or lower edge of the moving magnetic tape with respect to the tape head, and to generate a signal in response thereto; and wherein the active positioner control device is further configured receive the signal and to use the signal to cause the first tape guide tilt positioner to tilt the first tape guide about the first tape guide axis in response thereto.

17. An apparatus for positioning a moving magnetic tape with respect to a tape head element in a tape head across which the moving magnetic tape is configured to move in a primary direction, comprising:

a first tape guide supported proximate to a first side of the tape head and mounted along a first tape guide axis, the first tape guide being configured to support the magnetic tape as the tape travels past the tape head; and a first tape guide translation positioner configured to translate the first tape guide along the first tape guide axis; and an active positioner control device configured to, in response to detection of wander of the moving magnetic tape, cause the first tape guide translation positioner to translate the first tape guide along the first tare guide axis as the magnetic tape is moved across the tape head and the first tape guide, to thereby cause the magnetic tape to move in a secondary direction which is essentially perpendicular to the primary direction.

18. The apparatus of claim 17, and further comprising a second tape guide supported proximate to a second side of the tape head and mounted along a second tape guide axis, the second tape guide being configured to support the magnetic tape as the tape travels past the tape head;

a second tape guide translation positioner configured to translate the second tape guide along the second tape guide axis; and wherein the active positioner control device is further configured to position the second tape guide translation positioner in response to detection of wander of the moving magnetic tape.

19. The apparatus of claim 17, and further comprising:
a second tape guide supported proximate to a second side of the tape head and mounted along a second tape guide axis, the second tape guide being configured to support the magnetic tape as the tape travels past the tape head;

a coupling frame mounted about a pivot axis, and wherein the first and second tape guides are supported by the coupling frame, and wherein the first tape guide translation positioner is configured to cause the coupling frame to pivot about the pivot axis and thereby cause the first and second tape guides to translate along their respective tape guide axes, as well as to pivot about their respective axes at the same time.

20. The apparatus of claim 17, and further comprising:
a first tape guide support bracket;

a chassis configured to support the tape head, the first tape guide support bracket and the first tape guide translation positioner; and wherein the first tape guide support bracket supports the first tape guide, and further wherein the first tape guide support bracket is dynamically mounted to the chassis about a neutral balance point to isolate the first tape guide from dynamic input to the chassis.

21. An apparatus for positioning a moving magnetic tape which is moving in a primary direction of travel between a tape source reel and a tape take-up reel, comprising:

a first tape guide over which the tape moves in moving between the tape source reel and the take-up reel, the first tape guide being selectively positionable to cause the tape to move in a direction perpendicular to the primary direction of travel; and a first tape guide positioner configured to selectively and actively cause the first tape guide to be repositioned as the moving magnetic tape is moved across the first tape guide to thereby cause the tape to move in a direction perpendicular to the primary direction of travel.

22. The apparatus of claim 21 wherein at least one of said tape source reel or said take-up reel comprises a flange to constrain the magnetic tape to the reel, and wherein the magnetic tape defines an upper and a lower tape edge, the apparatus further comprising a sensor configured to detect when at least one of the upper or lower edge of the magnetic tape is approaching the flange and generate a signal in response thereto, and wherein the sensor is in signal communication with the tape guide positioner, and the tape guide positioner is further configured to be responsive to the signal from the sensor and acts to move the tape guide to cause the magnetic tape to move away from the flange.

23. The apparatus of claim 21 wherein the magnetic tape defines an upper tape edge, and wherein the first tape guide positioner is selectively actuated to cause the magnetic tape to accumulate on at least one of the reels such that the upper tape edge of earlier tape accumulation onto the reel is not in alignment with subsequent tape accumulation onto the reel.

24. The apparatus of claim 21, and further comprising a second tape guide over which the tape moves in moving between the tape source reel and the take-up reel, the second tape guide being selectively positionable to cause the tape to move in a direction perpendicular to the primary direction of travel; and a second tape guide positioner configured to selectively and actively position the first tape guide.

25. The apparatus of claim 24, and wherein a tape head is positioned such that the magnetic tape will pass over a tape head in moving between the tape source reel and the take-up reel, and wherein the first tape guide is located proximate a selected one of the reels, and the second tape guide is located proximate a first side of the tape head, and wherein the first tape guide positioner is primarily configured to guide tape onto the selected tape reel, and the second tape guide positioner is primarily configured to cause the second tape guide to position the tape with respect to the tape head.

26. The apparatus of claim 25, and further comprising a third tape guide over which the tape moves in moving between the tape source reel and the take-up reel, the third tape guide being located between the other tape reel and the tape head, the third tape guide being selectively positionable to cause the tape to move in a direction perpendicular to the primary direction of travel; and a third tape guide positioner configured to selectively and actively position the first tape guide.

27. The apparatus of claim 26, and further comprising a fourth tape guide over which the tape moves in moving between the tape source reel and the take-up reel, the fourth tape guide being located adjacent a second side of the tape head and the third tape guide being located proximate the other reel;

a fourth tape guide positioner configured to selectively and actively position the first tape guide; and wherein the third tape guide positioner is primarily configured guide tape onto the other tape reel, and the fourth tape guide positioner is primarily configured to cause the fourth tape guide to position the tape with respect to the tape head.

\* \* \* \* \*